No. 628,845. Patented July 11, 1899.
E. E. POWERS.
PNEUMATIC WHEEL.
(Application filed June 24, 1898.)
(No Model.) 3 Sheets—Sheet 1.

WITNESSES:
Geo. W. Jaekel.
M. H. Wintzel.

INVENTOR
Edward E. Powers
BY
ATTORNEYS.

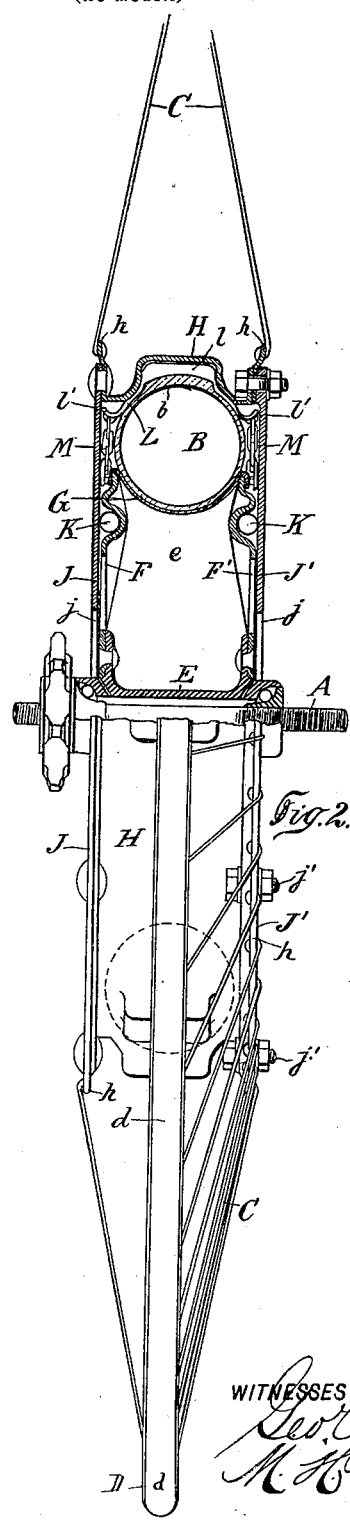

No. 628,845. Patented July 11, 1899.
E. E. POWERS.
PNEUMATIC WHEEL.
(Application filed June 24, 1898.)

(No Model.) 3 Sheets—Sheet 3.

WITNESSES:
Geo. E. Jaekel.
M. H. Wurtzel.

INVENTOR
Edward E. Powers
BY Jaquett Roegner
ATTORNEYS.

THE NORRIS PETERS CO., PHOTO-LITHO., WASHINGTON, D. C.

UNITED STATES PATENT OFFICE.

EDWARD EVERETT POWERS, OF GENEVA, SWITZERLAND.

PNEUMATIC WHEEL.

SPECIFICATION forming part of Letters Patent No. 628,845, dated July 11, 1899.

Application filed June 24, 1898. Serial No. 684,353. (No model.)

*To all whom it may concern:*

Be it known that I, EDWARD EVERETT POWERS, a citizen of the United States, residing at Geneva, Switzerland, have invented certain new and useful Improvements in Pneumatic Wheels, of which the following is a specification.

Figure 1:
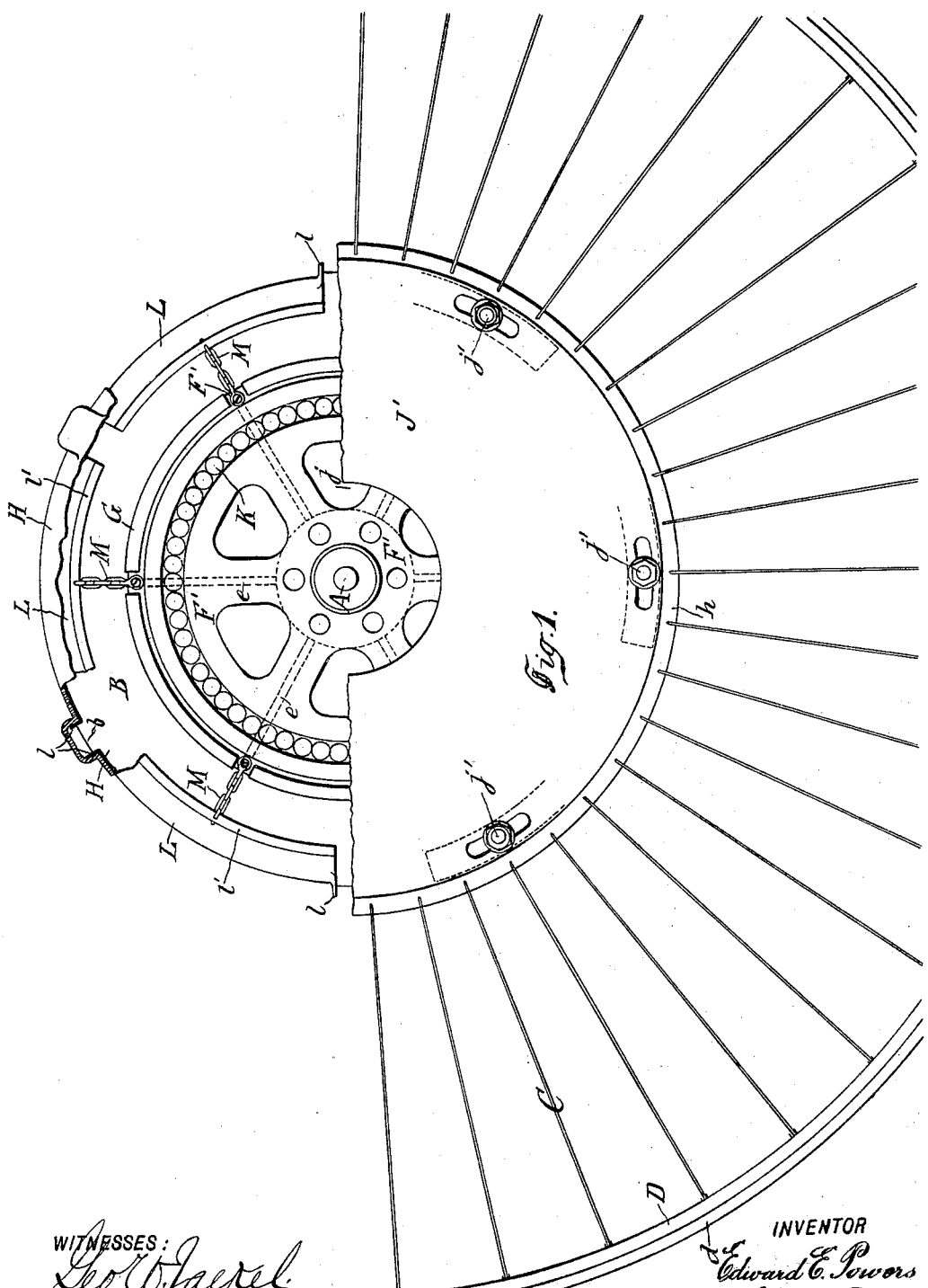
Figure 4:
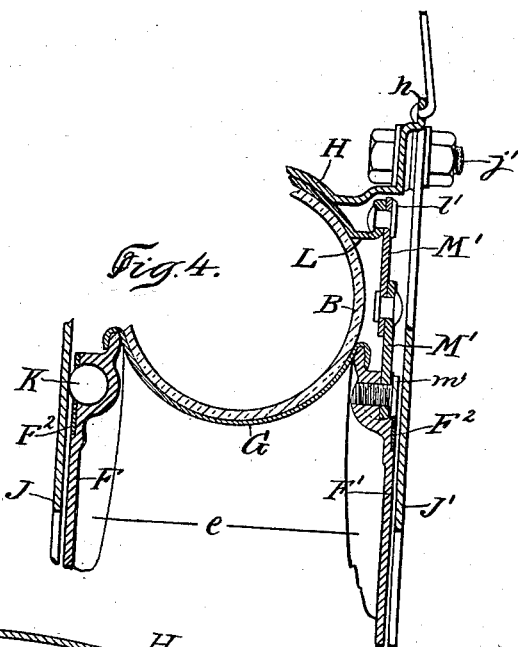
Figure 5:
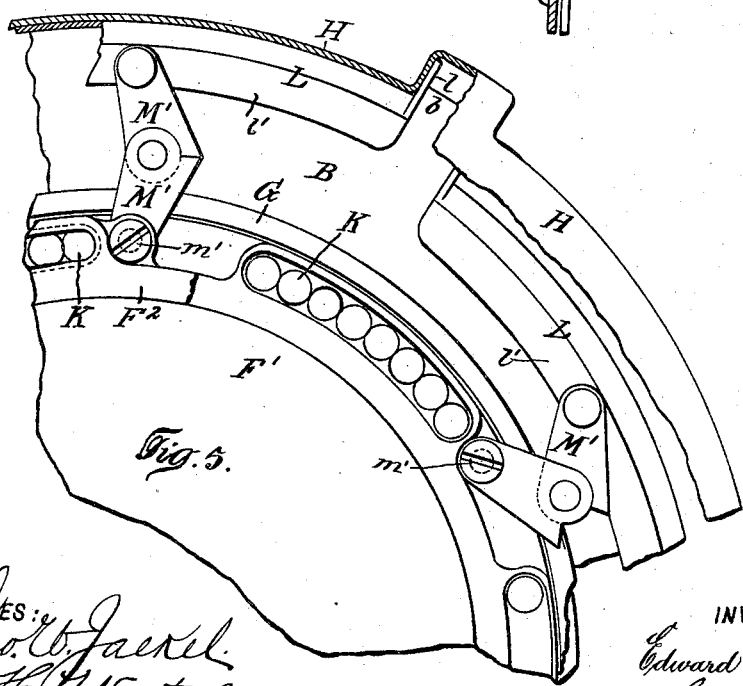

The invention consists of a wheel formed of an outer portion having two concentrical rims connected with one another by the rays and of an inner portion having a nave rigidly connected to one of the rims and those two portions being connected with one another by means of an air-chamber. This arrangement has the great advantage of placing the air-chamber out of reach of certain objects, (sharp stones, glass, nails, &c.,) which are the most frequent causes of the bursting open of pneumatic tires.
In the annexed drawings, showing, by way of example, two constructions of the invention, Figure 1 is a partial view of the face of the wheel with sectional portions. Fig. 2 is a section of the wheel illustrated in Fig. 1. Fig. 3 illustrates in face and longitudinal section view $x\,y$ and in transverse section view $u\,w$, on an enlarged scale, a detail of construction of the same wheel. Fig. 4 illustrates in section a modification of the construction illustrated in Fig. 1. Fig. 5 is a front view of this modification.

In Figs. 1 to 3, A is the axis of the wheel. B is the air-chamber. C are the rays; and D is the periphery of the wheel, provided with a solid rubber tire $d$.

To the hub E there are provided two inside cheeks F and F', with intermediate arms $e$, to which an inside wheel-rim G is fixed, around which the air-chamber B is engaged. Around the said air-chamber B a second inside wheel-rim H is arranged, the edges $h$ of which are raised up to receive the rays C, and to the said rim H there are fixed two outside cheeks J J', which bear against the inside cheeks F F' of the hub E, so as to maintain the wheel-rim H laterally in position on the air-chamber B. Now as the said wheel-rim H and its cheeks J J' need to be movable with regard to the hub of the rim G, pivoted on the axis A, the cheeks J J' are provided with a hole $j$, which is large enough for the hub of the axis to which the inner wheel-rim G is fixed to work loose within the outer wheel-rim H. On the other hand, this displacement of the cheeks J J' with respect to the cheeks F F' having to take place without strain, whatever the position of the wheel may be, balls K are arranged in suitable lodgings between the said inside and outside cheeks, so as to render their play easy. The edges $h$ of the second inside wheel-rim H are connected by rays C, arranged in any suitable ways whatever to the outside wheel-rim D.

In order to have the outer wheel-rim D constantly rotating with the inside rim G, there are provided segments between the inside rim H and the air-chamber B, said segments being formed so as to suit the outside shape of the inflated air-chamber, and they are provided with projections $l$, passing through suitable openings of the wheel-rim H, so as to be separable from the same in the radial directions without being allowed to rotate with respect to it. Moreover, the segments L are provided with inside projections $l'$, connected by suitable links or chains M to the inside cheeks F F'. Therefore the rotation of said cheeks F F' is transmitted to the segments L with the help of said links or chains M, and the projections $l$ of the said segments L cause the rotation of the wheel-rim H and of the outside wheel-rim D as well.

In order to mount the wheel and to take it easily to pieces, one of the outside cheeks J only is riveted to the rim H. The cheek J' is fixed to the same by means of bolts $j'$. Moreover, as it may be convenient to be able to regulate very accurately the distance of the cheeks J and J' from one another, so as to determine the play of the balls K, the cheek J' is made to fit on the rims of the wheel-rims H in the manner shown on an enlarged scale in Fig. 3. The cheek J' has projecting segments $j^2$, each forming an inclined plane in the circumferential direction, and the edges $h$ of the rim H have corresponding projections $h'$, arranged so that when the projections $j^2$ of the cheek J are supported by the projections $h'$ of the wheel-rim H and one of these pieces is rotated with regard to the other said pieces are brought together or separated. The bolts $j'$ passing through the extended openings of the cheek J', the same may be secured in the required position with regard to the wheel-rim H, once the required distance of the cheeks is obtained, by the means just described.

In order to avoid the wear of the air-chamber B in the places where the ends of the segments L are supported on the said air-chamber, the same is provided with reinforcements $b$, which are placed between the ends of two neighboring segments. (See Figs. 1 and 2.)

In the modification shown in Figs. 4 and 5 the balls K are arranged farther from the center of the wheel and held in their lodgings in the inside cheeks F F' by a perforated plate $F^2$, the openings of which are corresponding to the lodgings made in the cheeks F and F to receive the balls K, but narrower than those lodgings, so that the balls cannot get out of them when the plates $F^2$ are placed on. The plates $F^2$ are held on the cheeks F F' with the help of screws $m'$, securing the links M', which are formed of knee-caps connected in the center, which can be depressed, as shown in Fig. 5.

The described wheel is provided in a suitable point of the air-chamber with a valve of the usual system, allowing the inflating of the same. It is provided, too, with suitable devices for the greasing of the balls, hub, and cheeks. (Not shown in the drawings.)

The inside portions of the wheel can be made of wood to lighten the construction.

The balls K may be arranged in radial series instead of forming a circle.

The fastening of the wheel-rim H to the wheel-rim G may be done directly with the aid of links having the desired play without using the segments L.

In order to prevent the dust entering the opening $j$, the latter may be covered over with a shield of metal or of any other suitable material fixed to the hub or to one of the cheeks and bearing with friction on the outside cheek.

The described wheel works in the following manner: The weight of the vehicle acting upon the axle A is transmitted by the rays $e$ to the lower portion of the rim G, which bears upon the air-chamber B. This latter bears in turn upon the rim H, which is connected to the rays C and to the rim D. The air-chamber B forming an elastic intermedium between the rims G and H, it necessarily results of this that the inferior portion of said air-chamber is compressed by the weight of the vehicle, and the said compression involves the said portion of the wheel $a$ drawing the rim G nearer to the rim H, to which corresponds a separation of the said rim in the diametrical opposite portion of the wheel. When the latter is rotating, the portion of the rim G which draws nearer to the corresponding portion of the rim H changes every moment; but the chains M or the links M' cause always the rim H to rotate with the rim G. On the other hand, the flanges J and J' fixed to the rim H and bearing laterally by means of the balls K against the rim G prevent the lateral displacing of G or of B with regard to H.

Having thus fully described my invention, I claim—

1. A pneumatic wheel, consisting of a hub, annular flanges extending from said hub, a wheel-rim F fixed to said flanges, an annular elastic air-chamber around said wheel-rim, a wheel-rim H around the air-chamber, intermediate segments arranged between the rim H and the air-chamber and interlocking with said rim H, annular flanges on the latter extending over the aforesaid flanges, one of said flanges being rigidly fastened to the rim H and the other having a pin-and-slot connection therewith, spokes radiating from the rim H, and a surrounding tire with which the spokes are connected, substantially as set forth.

2. In a wheel of the system specified, the arrangement of the projections on inclined planes on the edge of the wheel-rim H and on the cheek J' to regulate accurately the distance of the cheeks J and J', substantially as shown and described.

In testimony that I claim the foregoing as my invention I have signed my name in presence of two subscribing witnesses.

EDWARD EVERETT POWERS. [L. S.]

Witnesses:
ELMER SCHNEIDER,
E. F. BARRY.